(12) United States Patent
Hsu et al.

(10) Patent No.: US 8,757,810 B2
(45) Date of Patent: *Jun. 24, 2014

(54) LIGHT SOURCE DEVICE AND PROJECTOR

(75) Inventors: Chien-Wen Hsu, New Taipei (TW);
Wen-Pin Yeh, New Taipei (TW)

(73) Assignee: Hon Hai Precision Industry Co., Ltd.,
New Taipei (TW)

( * ) Notice: Subject to any disclaimer, the term of this patent is extended or adjusted under 35 U.S.C. 154(b) by 29 days.

This patent is subject to a terminal disclaimer.

(21) Appl. No.: 13/473,620

(22) Filed: May 17, 2012

(65) Prior Publication Data

US 2013/0033683 A1 Feb. 7, 2013

(30) Foreign Application Priority Data

Aug. 3, 2011 (TW) .................................. 100127657

(51) Int. Cl.
  *G03B 21/00* (2006.01)
(52) U.S. Cl.
  USPC ................... 353/31; 353/30; 353/33; 353/84; 353/85; 353/98; 748/744
(58) Field of Classification Search
  USPC ........... 353/30, 31, 33, 34, 38, 77, 78, 98, 84, 353/85, 119, 122; 348/743–747, E5.133, 348/E5.141, E9.027; 349/5, 7–9
  See application file for complete search history.

(56) References Cited

U.S. PATENT DOCUMENTS

| 2007/0019408 | A1* | 1/2007 | McGuire et al. | 362/231 |
| 2008/0239251 | A1* | 10/2008 | Destain | 353/98 |
| 2011/0194038 | A1* | 8/2011 | Kimura et al. | 349/7 |

FOREIGN PATENT DOCUMENTS

TW 201126254 A 8/2011

* cited by examiner

*Primary Examiner* — Sultan Chowdhury
(74) *Attorney, Agent, or Firm* — Novak Druce Connolly Bove + Quigg LLP

(57) ABSTRACT

A projector includes a projection lens set, a DMD, a prism unit, a light guide unit, and a light source device. The light source device includes a first and a second LEDs, a laser light source, and a color wheel. The first LED is positioned in a first optical path and generates a first light. The laser light source is positioned in a second optical path and generates a laser light. The second LED is positioned in a third optical path and generates a second light. The laser light irradiates the color wheel to generate a third light. A light merging unit merges the first, second, and third lights. The light guide unit guides the mixed light to the prism unit. The mixed light is refracted to the DMD via the prism unit. The refracted mixed light is reflected to the projection lens set via the DMD.

18 Claims, 2 Drawing Sheets

LIGHT SOURCE DEVICE AND PROJECTOR

BACKGROUND

1. Technical Field

The present disclosure relates to a light source device and a projector having the light source device.

2. Description of Related Art

As projectors become more commonly used, heightened requirements are imposed on the imaging quality of the projectors. Generally, a projection system primarily includes a light source device and a projection lens set. Special emphasis has been put on improving the arrangement reliability of components, shrinking the overall volume and increasing the light source efficiency in the light source device to enhance the imaging brightness in the back-end projection lens set.

To improve the image brightness, a conventional projector utilizes a number of light sources to provide various color lights. However, the light sources of the light source device not only lead to a complex and bulky design of the internal structure of the projector, but also cause poor heat dissipation. After a period of operation, the heat accumulated by the high temperature tends to shorten the lifetime of the projector and cause damage to the light source device.

Thus, there is a need for a projector which can overcome the above described shortcomings.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
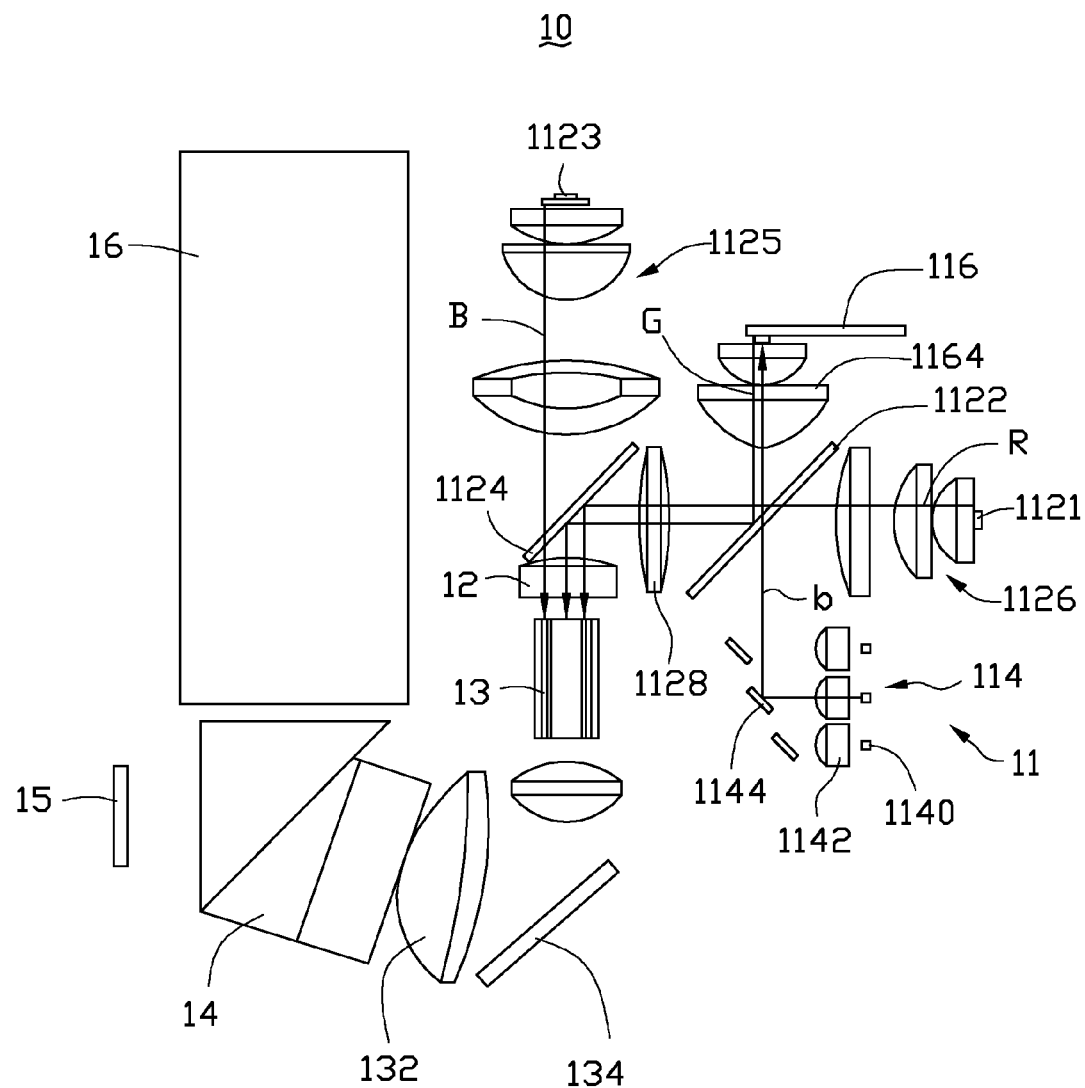
FIG. 1 is a schematic view of one embodiment of a projector.

According to one embodiment, a projector 10 as illustrated in FIG. 1 includes a light source device 11, a light merging unit 12, a light guide unit 13, a prism unit 14, a digital micro-mirror device (DMD) 15, and a projection lens set 16. The projector 10 also comprise a number of mirrors 134, 1144, and a number of lenses 132, 1128, 1142, 1164. The light source device 11 and the projection lens set 16 are positioned at two sides of the projector 10, respectively. In one embodiment, the light guide unit 13 is a light tunnel. The prism unit 14 is a reverse total internal reflection (TIR) prism including two prisms combined together.

The light source device 11 includes a first light emitting diode (LED) 1121, a second LED 1123, a laser light source 114, a color wheel 116, a first dichroic mirror 1122, a second dichroic mirror 1124, a first lens set 1126, and a second lens set 1125. The first LED 1121, the first lens set 1126, the first dichroic mirror 1122, the second dichroic mirror 1124, and the lens 1128 are positioned in the light source device 11 along a first optical path. The laser light source 114, the lenses 1142, the mirrors 1144, the first dichroic mirror 1122, the lens 1164, and the color wheel 116 are positioned in the light source device 11 along a second optical path. The second LED 1123 and the second dichroic mirror 1124 are positioned along a third optical path. Thus, the first dichroic mirror 1122 is positioned at the intersection of the first optical path and the second optical path. The second dichroic mirror 1124 is positioned at the intersection of the third optical path and the first optical path. The first lens set 1126 is positioned between the first LED 1121 and the first dichroic mirror 1122. The second lens set 1125 is positioned between the second LED 1123 and the second dichroic mirror 1124. The lens 1128 is positioned between the first dichroic mirror 1122 and the second dichroic mirror 1124. In one embodiment, the first optical path is substantially perpendicular to the second optical path.

When the projector 10 operates, the first LED 1121 generates a first light along the first optical path, the laser light source 114 generates a laser light along the second optical path, and the second LED 1123 generates a second light along a third optical path. In one embodiment, the first LED 1121 is a red LED for generating a red light R. The second LED 1123 is a blue LED for generating a blue light B. The laser light source 114 includes a number of laser generators 1140 for generating the laser light b. In one embodiment, the laser light source 114 includes three laser generators 1140. The first LED 1121 and the laser generators 1140 are positioned at the same side of the light source device 11.

The red light R irradiates the second dichroic mirror 1124 through the first lens set 1126, the first dichroic mirror 1122, and the lens 1128. The first lens set 1126 and the lens 1128 focus the red light R generated from the first LED 1121. The second dichroic mirror 1124 reflects the red light R to the light merging unit 12. The second lens set 1125 focuses the blue light B generated from the second LED 1123. The blue light B irradiates the second dichroic mirror 1124 through the second lens set 1125. Afterwards, the blue light B passes through the second dichroic mirror 1124 to the light merging unit 12. The lens 1142 focus the laser light b generated from the laser light source 114. The mirrors 1144 reflect the laser light b. The reflected laser light b irradiates a surface of the color wheel 116. In other words, the laser light B irradiates the surface of the color wheel 116 through the lens 1142 and the first dichroic mirror 1122.

Figure 2:
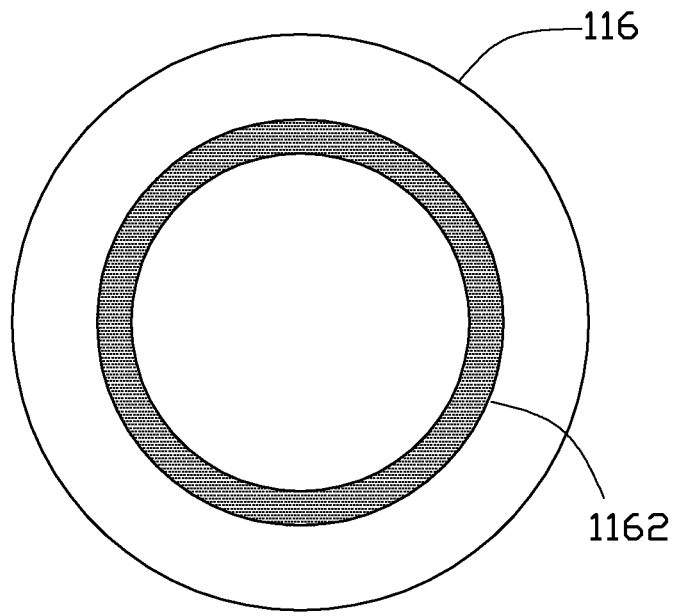
FIG. 2 is a schematic view of one embodiment of a color wheel of the projector shown in FIG. 1.

Referring to FIG. 2, the surface of the color wheel 116 includes an annular irradiative area 1162. A phosphor layer is applied on the annular irradiative area 1162. When the laser light b irradiates the annular irradiative area 1162 with the phosphor layer of the color wheel 116, the phosphor layer of the annular irradiative area 1162 generates a third light due to the irradiation of the laser light b. In one embodiment, the third light is a green light G. The green light G irradiates the first dichroic mirror 1122 through the lens 1164. The first dichroic mirror 1122 reflects the green light G to the second dichroic mirror 1124 through the lens 1128. In other words, the green light G irradiates the second dichroic mirror 1124 via the lenses 1128, 1164 and the first dichroic mirror 1122. The second dichroic mirror 1124 reflects the green light G to the light merging unit 12. The lens 1164 focus the green light G generated from the phosphor layer of the annular irradiative area 1162.

The light merging unit 12 merges the red light R generated from the first LED 1121, the blue light B generated from the second LED 1123, and the green light G generated from the phosphor layer of the annular irradiative area 1162 to generate a mixed light. The light guide unit 13 guides the mixed light to the prism unit 14 by the reflection of the mirror 134 and the focusing of the lens 132. The mixed light is refracted to the DMD 15 via the prism unit 14. The refracted mixed light is reflected to the projection lens set 16 via the DMD 15. Thus, the projector 10 can project an image on a screen.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

What is claimed is:

1. A light source device for a projector, comprising:
    a first light emitting diode (LED), positioned in a first optical path, the first LED being configured for generating a first light along the first optical path;
    a laser light source, positioned in a second optical path, the laser light source being configured for generating a laser light along the second optical path;
    a second LED, positioned in a third optical path, the second LED being configured for generating a second light along the third optical path; and
    a color wheel positioned in the second optical path;
    wherein the laser light irradiates the color wheel, and the color wheel generates a third light due to the irradiation of the laser light.

2. The light source device as claimed in claim 1, further comprising:
    a first dichroic mirror positioned at the intersection of the first optical path and the second optical path; and
    a second dichroic mirror positioned at the intersection of the third optical path and the first optical path.

3. The light source device as claimed in claim 2, further comprising a first lens set positioned between the first LED and the first dichroic mirror.

4. The light source device as claimed in claim 3, further comprising a lens positioned between the first and second dichroic mirrors; the first light irradiates the second dichroic mirror through the first lens set, the first dichroic mirror, and the lens; the first dichroic mirror reflects the third light, and the reflected third light irradiates the second dichroic mirror through the lens.

5. The light source device as claimed in claim 2, further comprising a second lens set positioned between the second LED and the second dichroic mirror.

6. The light source device as claimed in claim 2, further comprising a mirror being configured for reflecting the laser light, wherein the reflected laser light irradiates the color wheel through the first dichroic mirror.

7. The light source device as claimed in claim 1, wherein the color wheel comprises an irradiative area with a phosphor layer, the laser light irradiates the phosphor layer of the irradiative area to generate the third light.

8. The light source device as claimed in claim 7, wherein the irradiative area is an annular irradiative area.

9. The light source device as claimed in claim 1, wherein the first light is a red light, the second light is a blue light, and the third light is a green light.

10. A projector, comprising:
    a light source device comprising:
        a first LED, positioned in a first optical path, the first LED being configured for generating a first light along the first optical path;
        a laser light source, positioned in a second optical path, the laser light source being configured for generating a laser light along the second optical path;
        a second LED, positioned in a third optical path, the second LED being configured for generating a second light along the third optical path; and
        a color wheel positioned in the second optical path, wherein the laser light irradiates the color wheel, and the color wheel generates a third light due to the irradiation of the laser light;
    a light merging unit configured for merging the first, second, and third lights to generate a mixed light;
    a projection lens set;
    a digital micro-mirror device (DMD);
    a prism unit; and
    a light guide unit configured for guiding the mixed light to the prism unit;
    wherein the mixed light is refracted to the DMD via the prism unit, and then the refracted mixed light is reflected to the projection lens set via the DMD.

11. The projector as claimed in claim 10, wherein the light source device further comprises:
    a first dichroic mirror positioned at the intersection of the first optical path and the second optical path; and
    a second dichroic mirror positioned at the intersection of the third optical path and the first optical path.

12. The projector as claimed in claim 11, wherein the light source device further comprises a first lens set positioned between the first LED and the first dichroic mirror.

13. The projector as claimed in claim 12, wherein the light source device further comprises a lens positioned between the first and second dichroic mirrors; the first light irradiates the second dichroic mirror through the first lens set, the first dichroic mirror, and the lens; the first dichroic mirror reflects the third light, and the reflected third light irradiates the second dichroic mirror through the lens.

14. The projector as claimed in claim 11, wherein the light source device further comprises a second lens set positioned between the second LED and the second dichroic mirror.

15. The projector as claimed in claim 11, wherein the light source device further comprises a mirror being configured for reflecting the laser light, and the reflected laser light irradiates the color wheel through the first dichroic mirror.

16. The projector as claimed in claim 10, wherein the color wheel of the light source device comprises an irradiative area with a phosphor layer, the laser light irradiates the phosphor layer of the irradiative area to generate the third light.

17. The light source device as claimed in claim 16, wherein the irradiative area is an annular irradiative area.

18. The projector as claimed in claim 10, wherein the prism unit is a reverse total internal reflection (TIR) prism comprising two prisms combined together.

* * * * *